(12) United States Patent
Sugita et al.

(10) Patent No.: US 9,640,299 B2
(45) Date of Patent: May 2, 2017

(54) CROSSLINKED RESIN COMPOUND AND WIRE AND CABLE USING THE SAME

(71) Applicant: Hitachi Metals, Ltd., Tokyo (JP)

(72) Inventors: Keisuke Sugita, Hitachi (JP); Akinari Nakayama, Hitachinaka (JP)

(73) Assignee: HITACHI METALS, LTD., Tokyo (JP)

(*) Notice: Subject to any disclaimer, the term of this patent is extended or adjusted under 35 U.S.C. 154(b) by 0 days.

(21) Appl. No.: 14/140,023

(22) Filed: Dec. 24, 2013

(65) Prior Publication Data

US 2014/0182883 A1 Jul. 3, 2014

(30) Foreign Application Priority Data

Dec. 27, 2012 (JP) .................................. 2012-284790
Dec. 20, 2013 (JP) .................................. 2013-263135

(51) Int. Cl.
| | |
|---|---|
| *H01B 3/44* | (2006.01) |
| *C09D 123/08* | (2006.01) |
| *C08L 23/08* | (2006.01) |
| *C08K 5/00* | (2006.01) |
| *C08K 5/523* | (2006.01) |

(52) U.S. Cl.
CPC .......... *H01B 3/447* (2013.01); *C08L 23/0815* (2013.01); *C08L 23/0853* (2013.01); *C09D 123/0853* (2013.01); *H01B 3/441* (2013.01); *H01B 3/448* (2013.01); *C08K 5/0025* (2013.01); *C08K 5/523* (2013.01); *C08L 2312/06* (2013.01); *Y10T 428/2962* (2015.01)

(58) Field of Classification Search
CPC ....... H01B 7/0216; H01B 7/292; H01B 7/295
See application file for complete search history.

(56) References Cited

U.S. PATENT DOCUMENTS

| | | | |
|---|---|---|---|
| 5,396,104 A * | 3/1995 | Kimura | H01B 3/30 174/110 N |
| 6,064,002 A | 5/2000 | Hayami et al. | |
| 6,242,097 B1 * | 6/2001 | Nishiguchi et al. | 428/383 |
| 8,829,350 B2 * | 9/2014 | Iwasaki et al. | 174/110 R |
| 2009/0057009 A1 | 3/2009 | Sato | |
| 2009/0301751 A1 | 12/2009 | Iwasaki et al. | |

(Continued)

FOREIGN PATENT DOCUMENTS

| | | |
|---|---|---|
| EP | 2 720 234 A1 | 4/2014 |
| JP | 2000-198925 A | 7/2000 |
| JP | 2002-212355 A | 7/2002 |

(Continued)

OTHER PUBLICATIONS

Extended European Search Report dated Mar. 12, 2014.
Japanese Office Action dated Feb. 23, 2017 and English translation thereof.

*Primary Examiner* — Jeremy C Norris
*Assistant Examiner* — Muhammed Azam
(74) *Attorney, Agent, or Firm* — McGinn IP Law Group, PLLC.

(57) ABSTRACT

A crosslinked resin compound includes a resin compound including 0.1 to 20 parts by mass of one material selected from the group consisting of monomer having an epoxy group, acid anhydride and silane coupling agent with respect to 100 parts by mass of ethylene-based copolymer, and the resin compound is crosslinked.

14 Claims, 5 Drawing Sheets

(56) References Cited

U.S. PATENT DOCUMENTS

2010/0147549 A1* 6/2010 Shiina ..................... 174/113 C
2012/0318557 A1   12/2012 Iwasaki et al.

FOREIGN PATENT DOCUMENTS

| JP | 2004-281057 A | 10/2004 |
| JP | 2006-156407 A | 6/2006 |
| JP | 2006-310093 A | 11/2006 |
| JP | 2007-095439 A | 4/2007 |
| JP | 2007-207638 A | 8/2007 |
| JP | 2008-033147 A | 2/2008 |
| JP | 2009-298830 A | 12/2009 |
| JP | 2009-298831 A | 12/2009 |
| JP | 2011-049116 A | 3/2011 |
| JP | 2011-084683 A | 4/2011 |
| JP | 2011-084684 A | 4/2011 |
| JP | 2012-028123 A | 2/2012 |
| WO | WO 2012/169298 A1 | 12/2012 |

* cited by examiner

CROSSLINKED RESIN COMPOUND AND WIRE AND CABLE USING THE SAME

The present application is based on Japanese Patent Application No. 2012-284790 filed on Dec. 27, 2012 and Japanese Patent Application No. 2013-263135 filed on Dec. 20, 2013, the entire contents of which are incorporated herein by reference.

BACKGROUND OF THE INVENTION

1. Field of the Invention

The present invention relates to a crosslinked resin compound as well as a wire and a cable using the same, more particularly, to a crosslinked resin compound with the ensured adhesion with a resin molding, as well as a wire and a cable using the same.

2. Description of the Related Art

When equipment components such as sensor, electrode terminals, or other electronic circuits are connected to a wire or cable, a connecting portion therebetween and its periphery have been generally protected by coating with a mold resin. Since the electronic components such as sensor have been used for vehicle, robot, electronic equipment or the like for which high reliability is required, waterproofness and airtightness for the connecting portion between the resin molding and the wire or cable are the most important characteristics. Therefore, it is important to use a combination of the resin molding and a coating material for wires and cables, which can provide an excellent adhesion therebetween.

Thermoplastic polyurethanes have been generally used as a coating material for wires and cables in applications as described above, while polyamide resins and polybutylene terephthalate resins have been mainly used as a mold resin.

It should be noted that high heat resistance has been required more and more for wires and cables in recent years. For example, a crosslinked resin compound such as thermoplastic polyurethane crosslinked by electron beam irradiation or the like has been applied as the coating material. See e.g. JP-A 2006-156407, JP-A 2007-95439, and JP-A 2011-49116.

SUMMARY OF THE INVENTION

There is, however, a disadvantage in the prior arts. For example, when the crosslinked resin compound such as thermoplastic polyurethane is used as the coating material for an outermost layer of the wire or cable, the adhesion between the mold resin and the wire or cable may be insufficient so that the waterproofness and airtightness of a resin molding covering the wire or cable cannot be maintained.

Further, the good appearance is required for the outermost layer of the wire or cable.

Therefore, it is an object of the present invention to solve the above problems and to provide a crosslinked resin compound having excellent adhesion to the mold resin while keeping the good appearance, and a cable and a wire using the same.

According to a feature of the invention, a crosslinked resin compound comprises:

a resin compound comprising 0.1 to 20 parts by mass of one material selected from the group consisting of monomer having an epoxy group, acid anhydride and silane coupling agent with respect to 100 parts by mass of ethylene-based copolymer, and the resin compound being crosslinked.

The resin compound may be crosslinked by electron beam irradiation.

The ethylene-based copolymer may comprise ethylene vinyl acetate copolymer.

A content of the one material selected from the group consisting of the monomer having an epoxy group, the acid anhydride and the silane coupling agent is preferably 5 to 20 parts by mass with respect to 100 parts by mass of the ethylene-based copolymer.

According to another feature of the invention, a wire comprises:

a conductor; and an insulation covering an outer periphery of the conductor, wherein an outermost layer of the insulation comprises a crosslinked resin compound comprising a resin compound comprising 0.1 to 20 parts by mass of one material selected from the group consisting of monomer having an epoxy group, acid anhydride and silane coupling agent with respect to 100 parts by mass of ethylene-based copolymer, and the resin compound being crosslinked.

The resin compound may be crosslinked by electron beam irradiation.

The ethylene-based copolymer may comprise ethylene vinyl acetate copolymer.

An outermost layer of the insulation may be covered with a resin molding comprising polybutylene terephthalate resin or polyamide resin.

A content of the one material selected from the group consisting of the monomer having an epoxy group, the acid anhydride, and the silane coupling agent is preferably 5 to 20 parts by mass with respect to 100 parts by mass of the ethylene-based copolymer.

According to a still another feature of the invention, a cable comprises:

one or more wire provided solely, bundled together or stranded together, the one or more wire comprising a conductor and an insulation covering an outer periphery of the conductor; and a sheath covering an outer periphery of the one or more wire, wherein an outermost layer of the sheath comprises a crosslinked resin compound comprising a resin compound comprising 0.1 to 20 parts by mass of one material selected from the group consisting of monomer having an epoxy group, acid anhydride and silane coupling agent with respect to 100 parts by mass of ethylene-based copolymer, and the resin compound being crosslinked.

The resin compound may be crosslinked by electron beam irradiation.

The ethylene-based copolymer may comprise ethylene vinyl acetate copolymer.

An outermost layer of the sheath may be covered with a resin molding comprising polybutylene terephthalate resin or polyamide resin.

A content of the one material selected from the group consisting of the monomer having an epoxy group, the acid anhydride and the silane coupling agent is preferably 5 to 20 parts by mass with respect to 100 parts by mass of the ethylene-based copolymer.

An outermost layer of the insulation may comprise a crosslinked resin compound comprising a resin compound comprising 0.1 to 20 parts by mass of one material selected from the group consisting of monomer having an epoxy group, acid anhydride and silane coupling agent with respect to 100 parts by mass of ethylene-based copolymer, and the resin compound being crosslinked.

A content of the one material selected from the group consisting of the monomer having an epoxy group, the acid anhydride and the silane coupling agent is preferably 5 to 20 parts by mass with respect to 100 parts by mass of the ethylene-based copolymer, wherein the resin molding may cover an outermost layer of the insulation together with the outermost layer of the sheath.

Effects of the Invention

According to the invention, it is possible to provide to provide a crosslinked resin compound having excellent adhesion to the mold resin while keeping the good appearance, and a cable and a wire using the same.

BRIEF DESCRIPTION OF THE DRAWINGS

Next, the present invention will be explained in more detail in conjunction with appended drawings, wherein.

DETAILED DESCRIPTION OF THE EMBODIMENTS

Next, embodiments according to the present invention will be described in more detail in conjunction with appended drawings.

(Configuration of Wires and Cables)

Firstly, wires and cables to be applied with the crosslinked resin compound according to the present invention will be described.

FIGS. 1 to 6 show wires and cables using the crosslinked resin compound according to the invention.

Figure 1:
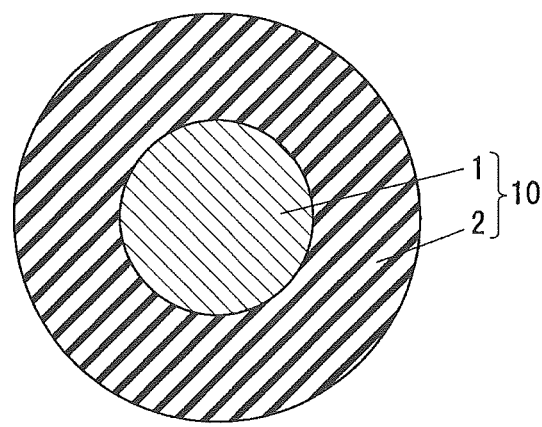
FIG. 1 is a detailed cross sectional view showing a wire using a crosslinked resin compound for an insulation in one embodiment of the present invention.

FIG. 1 shows a wire 10 comprising a conductor 1 and an insulation 2 covering an outer periphery of the conductor 1. More precisely, the conductor 1 is coated with the resin compound by extrusion coating and crosslinked by electron beam irradiation, to provide the insulation 2 comprising the crosslinked resin compound according to the invention.

Figure 2:
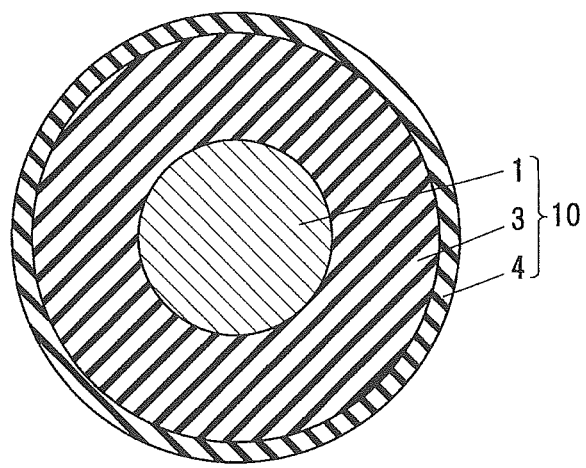
FIG. 2 is a detailed cross sectional view showing a wire using a crosslinked resin compound for an outer insulating layer in one embodiment of the present invention.

FIG. 2 shows a wire 10 comprising a conductor 1, an inner insulating layer 3 for coating an outer periphery of the conductor 1, and an outer insulating layer 4 for coating an outer periphery of the inner insulating layer 3. The inner insulating layer 3 is coated with the resin compound by extrusion coating and crosslinked by electron beam irradiation, to provide the outer insulating layer 4 comprising the crosslinked resin compound according to the invention.

Figure 3:
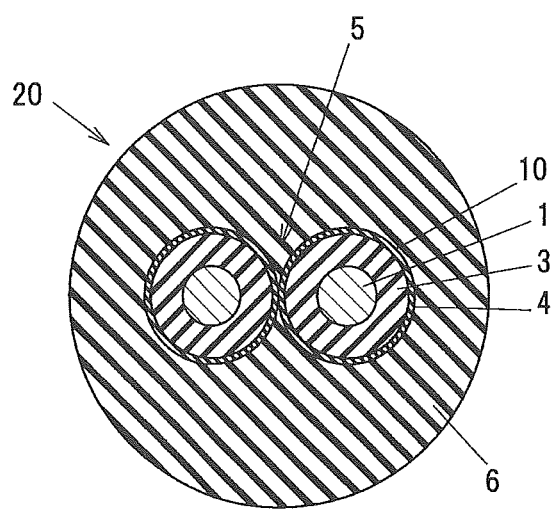
FIG. 3 is a detailed cross sectional view showing a cable using a crosslinked resin compound for an outer insulating layer of a wire in one embodiment of the present invention.

FIG. 3 shows a cable 20 comprising a multicore twisted wire 5 formed by twisting two wires 10 as shown in FIG. 2, each of which comprises a conductor 1, an inner insulating layer 3 for coating an outer periphery of the conductor 1, and an outer insulating layer 4 comprising the crosslinked resin compound according to the invention for coating an outer periphery of the inner insulating layer 3, and a sheath 6 covering an outer periphery of the multicore twisted wire 5. The multicore twisted wire 5 is jacketed with the sheath 6 by extrusion coating.

Figure 4:
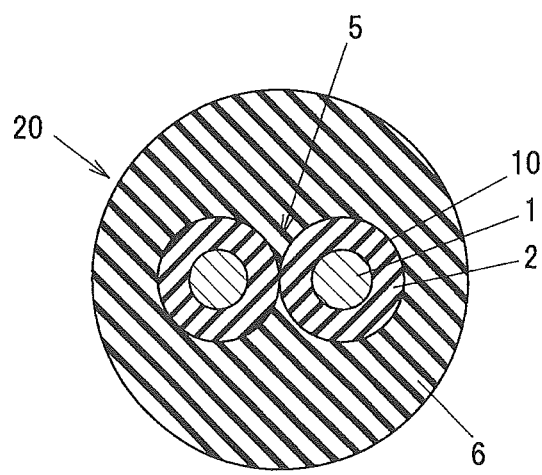
FIG. 4 is a detailed cross sectional view showing a cable using a crosslinked resin compound for a sheath in one embodiment of the present invention.

FIG. 4 shows a cable 20 comprising a multicore twisted wire 5 formed by twisting two wires 10 as shown in FIG. 1, each of which comprises a conductor 1, and an insulation 2 for coating an outer periphery of the conductor 1, and a sheath 6 covering an outer periphery of the multicore twisted wire 5. More precisely, the multicore twisted wire 5 is jacketed with the resin compound by extrusion coating and crosslinked by electron beam irradiation, to provide the sheath 6 comprising the crosslinked resin compound according to the invention.

Figure 5:
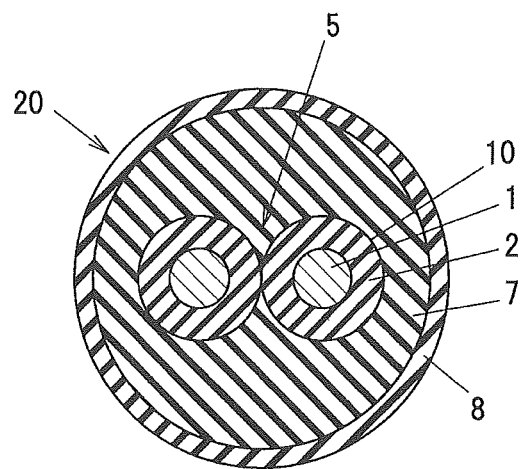
FIG. 5 is a detailed cross sectional view showing a cable using a crosslinked resin compound for an outer sheath layer in one embodiment of the present invention.

FIG. 5 shows a cable 20 comprising a multicore twisted wire 5 formed by twisting two wires 10 as shown in FIG. 1, each of which comprises a conductor 1, and an insulation 2 for coating an outer periphery of the conductor 1, an inner sheath layer 7 covering an outer periphery of the multicore twisted wire 5, and an outer sheath layer 8 covering an outer periphery of the inner sheath layer 7. More precisely, the multicore twisted wire 5 is jacketed with the inner sheath layer 7 and the resin compound by extrusion coating, and crosslinked by electron beam irradiation, to provide the outer sheath layer 8 comprising the crosslinked resin compound according to the invention.

Figure 6:
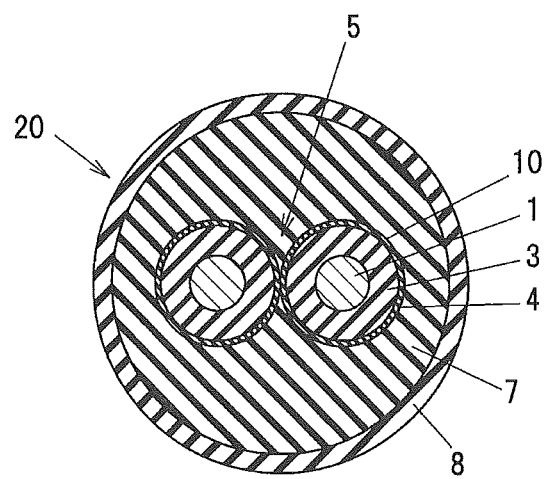
FIG. 6 is a detailed cross sectional view showing a cable using a crosslinked resin compound for an outer insulating layer and an outer sheath layer in one embodiment of the present invention.

FIG. 6 shows a cable 20 comprising a multicore twisted wire 5 formed by twisting two wires 10 as shown in FIG. 2, each of which comprises a conductor 1, an inner insulating layer 3 for coating an outer periphery of the conductor 1, and an outer insulating layer 4 comprising the crosslinked resin compound according to the invention for coating an outer periphery of the inner insulating layer 3, and an outer sheath layer 8 covering an outer periphery of the inner sheath layer 7. The multicore twisted wire 5 is jacketed with the inner sheath layer 7 and the resin compound by extrusion coating and crosslinked by electron beam irradiation, to provide the outer sheath layer 8 comprising the crosslinked resin compound according to the invention.

Figure 7:
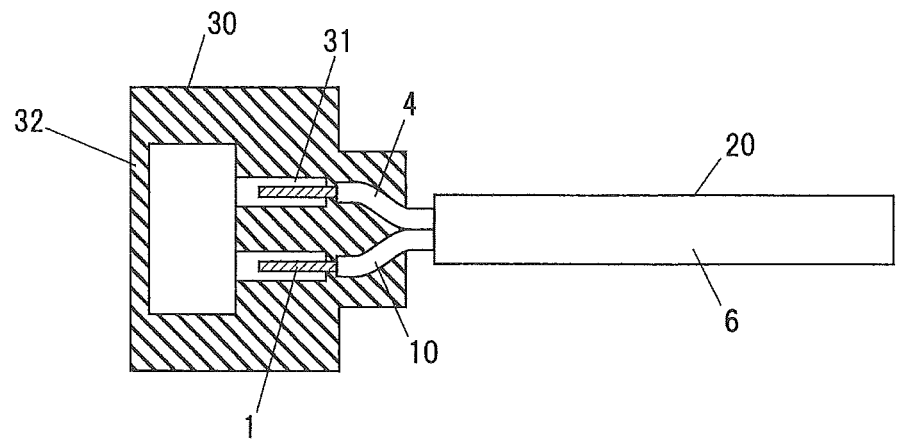
FIG. 7 is a partial cross sectional view showing an inside of a resin molding 30 of a molded product, in which a sensor is connected to a terminal of a cable comprising an insulation made of the crosslinked resin compound according to the invention and a connecting portion and its periphery are covered with the mold resin (wherein a cable 20 is shown in a plan view for the explanation purpose)
Figure 8:
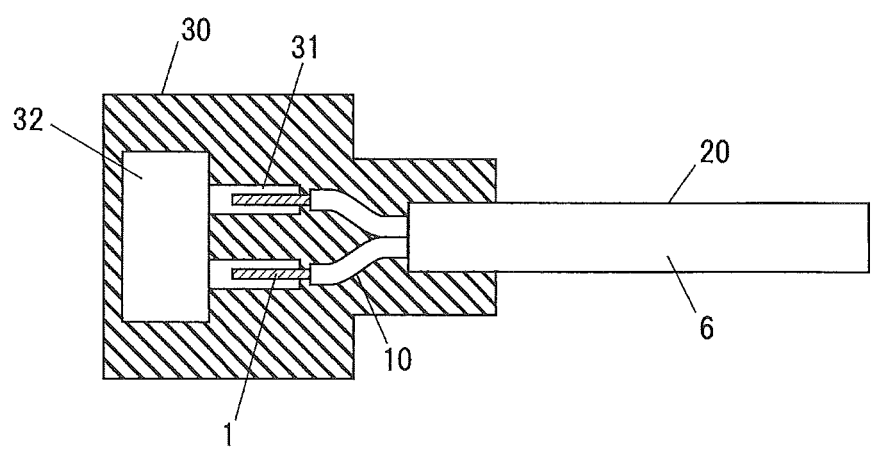
FIG. 8 is a partial cross sectional view showing an inside of a resin molding 30 of a molded product, in which a sensor is connected to a terminal of a cable comprising a sheath made of the crosslinked resin compound according to the invention and a connecting portion and its periphery are covered with the mold resin (wherein a cable 20 is shown in a plan view for the explanation purpose)

According to the crosslinked resin compound of the present invention, it is possible to improve the adhesion and airtightness with a resin molding 30 including polybutylene terephthalate resin or polyamide resin as shown in FIGS. 7 and 8.

(Configuration of a Molded Resin Product)

FIG. 7 is a partial cross sectional view showing an inside of a resin molding 30 of a molded product, in which a sensor is connected to a terminal of a cable comprising an insulation made of the crosslinked resin compound according to the invention and a connecting portion and its periphery are covered with the mold resin (wherein a cable 20 is shown in a plan view for the explanation purpose).

More precisely, the cable 20 is striped by peeling off a sheath 6 at one end of the cable 20, to expose ends of wires 10 from the sheath 6. Then, each exposed wire 10 is stripped by peeling off an inner insulating layer 3 and an outer insulating layer 4, to expose an end of a conductor 1 from the inner insulating layer 3 and the outer insulating layer 4. The exposed end of the conductor 1 is connected to each terminal 31 of a sensor 32. In FIG. 7, the resin molding 30 covers the sensor 32, the terminals 31 and the conductors 1 together with the outer insulating layer 4.

FIG. 8 is a partial cross sectional view showing an inside of a resin molding 30 of a molded product, in which a sensor is connected to a terminal of a cable comprising a sheath made of the crosslinked resin compound according to the invention and a connecting portion and its periphery are covered with the mold resin (wherein a cable 20 is shown in a plan view for the explanation purpose). More precisely, the cable 20 is striped by peeling off a sheath 6 at one end of the cable 20, to expose ends of wires 10 from the sheath 6. Then, each exposed wire 10 is stripped by peeling off an inner insulating layer 3 and an outer insulating layer 4, to expose an end of a conductor 1 from the inner insulating layer 3 and the outer insulating layer 4. The exposed end of the conductor 1 is connected to each terminal 31 of a sensor 32. In FIG. 7, the resin molding 30 covers the sensor 32, the terminals 31, the conductors 1, and the outer insulating layer 4 together with the outermost layer of the sheath 6. In this embodiment, each of the outer insulating layer 4 and the sheath 6 comprises the crosslinked resin compound according to the present invention.

The adhesion and airtightness of the resin molding 30 with the outer insulating layer 4 or the sheath 6 comprising the crosslinked resin compound according to the present invention would be improved as compared to the case of using the conventional resin compound.

(Crosslinked Resin Compound)

As a result of intensive studies on the materials of the outermost coating layer of the wire or cable adapted to contact with the mold resin comprising the polyamide resin or polybutylene terephthalate resin, the Inventors have found that high adhesion with the mold resin can be maintained by using a crosslinked resin compound formed by crosslinking ethylene-based copolymer including a monomer or specific material having one or more specific functional groups in its molecular structure, then achieved the present invention.

In one embodiment of the present invention, a crosslinked resin compound comprises 0.1 to 20 parts by mass of one material selected from the group consisting of monomer having an epoxy group, acid anhydride, and silane coupling agent, with respect to 100 parts by mass of ethylene-based copolymer.

In the present invention, acid anhydride, silane coupling agent, or monomer having an epoxy group is added to the ethylene-based copolymer to provide a resin compound, and the resin compound is applied to a conductor or the like by extrusion coating. Thereafter, the coated resin compound is crosslinked by electron beam irradiation. As a result, the ethylene-based copolymer is polymerized with the acid anhydride, silane coupling agent, or monomer having an epoxy group, and in this state, the crosslinked resin compound contacts with the mold resin comprising polybutylene terephthalate resin or polyamide resin, so that the adhesion and airtightness therebetween can be improved.

Further, the electron beam irradiation can improve the heat resistance, since the entire portion of the resin compound can be crosslinked by the electron beam irradiation.

(Ethylene-Based Copolymer)

The ethylene-based copolymer to be used in the present invention may comprise e.g. high-density polyethylene, linear low-density polyethylene, low-density polyethylene, very low-density polyethylene, ethylenebutene-1 copolymer, ethylenehexane-1 copolymer, ethyleneoctene-1 copolymer, ethylene-vinyl acetate copolymer, ethylene methyl acrylate copolymer, ethylene ethyl acrylate copolymer, ethylene methyl methacrylate copolymer, ethylene butyl acrylate copolymer, ethylene-butene-hexane ternary copolymer, and the like. These ethylene-based copolymers may be used alone or in combination of two or more thereof. The melt index of the ethylene-based copolymer is not specifically limited in the present invention.

Among the above listed ethylene-based copolymers, ethylene-vinyl acetate copolymer is suitable from the viewpoint of the adhesion with the mold resin. The content 26 of vinyl acetate and the melt index of the ethylene-vinyl acetate copolymer are not specifically limited in the present invention.

(Acid Anhydride)

The acid anhydride to be used in the present invention may include e.g. maleic anhydride, phthalic anhydride, and the like.

(Silane Coupling Agent)

The silane coupling agent (silane compound) to be used in the present invention may include a vinylsilane compound such as vinyltrimethoxysilane, vinyltriethoxysilane, vinyltris(β-methoxyethoxy)silane; an aminosilane compound such as γ-aminopropyltrimethoxysilane, γ-aminopropyltriethoxysilane, N-β-(aminoethyl)γ-aminopropyltrimethoxysilane, β-(aminoethyl)γ-aminopropylmethyldimethoxysilane, N-phenyl-γ-aminopropyltrimethoxysilane; an epoxysilane compound such as β-(3,4epoxycyclohexyl)ethyltrimethoxysilane, γ-glycidoxypropyltrimethoxysilane, γ-glycidoxypropylmethyldiethoxysilane; an acrylsilane compound such as γ-methacryloxypropyltrimethoxysilane; a polysulfidesilane compound such as bis(3-(triethoxysilyl)propyl)disulfide, bis(3-(triethoxysilyl)propyl)tetrasulfide; a mercaptosilane compound such as 3-mercaptopropyltrimethoxysilane, 3-mercaptopropyltriethoxysilane.

(Monomer Having an Epoxy Group)

The monomer having an epoxy group (epoxy monomer) to be used in the present invention may include e.g. 1-vinyl cyclohexane-3,4-epoxide, limonene monooxide, 1,3-butadiene monoepoxide, 1,2-epoxy-9-decene, glycidyl acrylate, glycidyl methacrylate, vinyl glycidyl ether, and the like.

(The content of the additive element)

The content of the acid anhydride, the silane coupling agent, and the monomer having an epoxy group is preferably 0.1 to 20 parts by mass with respect to 100 parts by mass of the ethylene copolymer. When the content of the above additive elements is less than 0.1 parts by mass, the adhesion with the mold resin may be insufficient. When the content of the above additive elements is greater than 20 parts by mass, the acid anhydride, the silane coupling agent, or the monomer having an epoxy group included in the crosslinked resin compound may precipitate (bleed out) on a surface of an insulation or sheath as a bloom so that the appearance of a wire or cable may be significantly impaired.

The acid anhydride, the silane coupling agent, or the monomer having an epoxy group may be copolymerized or graft-copolymerized with the ethylene-based copolymer previously, i.e. prior to crosslinking. The acid anhydride, the silane coupling agent, or the monomer having an epoxy group may be simply mixed with the ethylene-based copolymer and applied as an insulation or sheath of a wire or cable by extrusion coating. For this case, the grafting reaction with the ethylene-based copolymer occurs by the irradiation of the electron beam to the wire or cable.

In the case of the graft copolymerization prior to crosslinking, known methods of graft copolymerization may be used. For example, a free radical generator may be added to the ethylene-based copolymer in addition to the acid anhydride, the silane coupling agent, or the monomer having an epoxy group, and kneaded at a high temperature, thereby causing the grafting reaction.

As the free radical generator, organoperoxides such as dicumyl peroxide, benzyl peroxide, 1,1-bis(t-butylperoxy)-3,3,5-trimethylcyclohexane, t-butylperoxyisopropyl carbonate, t-butylperoxy benzoate, 2,5-dimethyl-2,5-bis(t-benzoylperoxy)hexane, methyletylketone peroxide, 2,2-bis(t-butylperoxy)butane, cumene hydroperoxide or the like may be mainly used.

(Other Additives)

Further, a flame retardant may be added to the crosslinked resin compound according to the present invention. As the flame retardant, triazine-based flame retardant, phosphorous-based flame retardant, metal hydroxide such as magnesium hydroxide, and the like are suitable. As the triazine-based flame retardant, melamine, melamine cyanurate, melamine phosphate, or the like may be used. As the phosphorous-based flame retardant, red phosphorous, phosphate ester, aromatic condensation phosphate ester, phosphazene compound, or the like may be used. The additive amount of the flame retardants may be determined in accordance with the required flame retardancy.

As necessary, other than the above-mentioned components, it is also possible to add additives such as a process oil, a processing aid, a flame retardant aid, a crosslinking agent, a crosslinking agent aid, an antioxidant, an ultraviolet absorber, a copper inhibitor, a lubricating agent, an inorganic filler, a compatibilizing agent, a stabilizer, carbon black, a colorant, and the like.

The wire and cable of the present invention may be provided as the outermost layer of the insulation or sheath by extrusion coating with the use of the known method, thereafter crosslinked by electron beam irradiation.

The dose of electron beam irradiation for crosslinking is not limited as long as the crosslinking reaction progresses sufficiently. The dose of electron beam irradiation is preferably 50 to 200 kGy.

In the present invention, the material of the insulation or sheath other than the outermost layer, namely the layer which does not affect the adhesion with the mold resin, is not specifically limited, and thermoplastic polyurethanes and general polyolefins may be used.

As the mold resin, polybutylene terephthalate resins and polyamide resins are suitable, and preferably reinforced by glass fibers. The mold resin covers the connecting portion between the wire or cable and the device components such as sensor or electrode terminal and a periphery thereof.

The mechanism of improvement in adhesion between the crosslinked resin compound according to the invention and the mold resin is assumed as follows. Each of the acid anhydride, silane coupling agent, and monomer having an epoxy group to be included in the ethylene-based copolymer has an active functional group comprising a hydroxyl group (—OH) and/or an oxo group (=O) in its molecular structure. The above active functional group bonds with polybutylene terephthalate resin or polyamide resin, thereby improves the adhesion between the crosslinked resin compound according to the invention and the mold resin.

EXAMPLES

Next, Examples of the present invention and Comparative examples will be explained below.

TABLE 1

(Unit: Parts by mass)

| | Items | Examples |||||||||||
|---|---|---|---|---|---|---|---|---|---|---|---|
| | | 1 | 2 | 3 | 4 | 5 | 6 | 7 | 8 | 9 | 10 |
| Insulation materials | Linear low density polyethylene 1) | 100 | 100 | 100 | | | | | | | |
| | Ethylene ethylacrylate 2) | | | | 100 | 100 | 100 | | | | |
| | Ethylene vinyl acetate copolymer 3) | | | | | | | 100 | 100 | 100 | |
| | Ethylene vinyl acetate copolymer 4) | | | | | | | | | | 100 |
| | Maleic anhydride-grafted linear low density polyethylene 5) | | | | | | | | | | |
| | Silane-grafted ethylene vinyl acetate copolymer 6) | | | | | | | | | | |
| | Glycidyl methacrylate-grafted linear low density polyethylene 7) | | | | | | | | | | |
| | Glycidyl methacrylate-grafted ethylene ethylacrylate 8) | | | | | | | | | | |
| | Glycidyl methacrylate-grafted ethylene vinyl acetate copolymer 9) | | | | | | | | | | |
| | Glycidyl methacrylate-grafted ethylene vinyl acetate copolymer 10) | | | | | | | | | | |
| | Glycidyl methacrylate-grafted ethylene vinyl acetate copolymer 11) | | | | | | | | | | |
| | Maleic anhydride 12) | 0.1 | 5 | 20 | | | | | | | |
| | Vinyltrimethoxysilane 13) | | | | 0.1 | 5 | 20 | | | | 10 |
| | Glycidyl methacrylate 14) | | | | | | | 0.1 | 5 | 20 | |

TABLE 1-continued (Unit: Parts by mass)

|  |  | | | | | | | | | | |
|---|---|---|---|---|---|---|---|---|---|---|---|
|  | Melamine cyanurate 15) | | | | | | | | | | 20 |
|  | Aromatic condensation phosphate ester 16) | | | | | | | | | | |
|  | Magnesium hydroxide 17) | | | | | | | | | | |
|  | Presence of crosslinking | Yes | Yes | Yes | Yes | Yes | Yes | Yes | Yes | Yes | Yes |
| Evaluation | Heat resistance (presence of fusion, crack) | No | No | No | No | No | No | No | No | No | No |
| results | Gel fraction | 70 | 72 | 73 | 73 | 75 | 77 | 76 | 78 | 81 | 77 |
|  | Presence of bloom | No | No | No | No | No | No | No | No | No | No |
|  | Airtightness with Polyamide | ○ | ○ | ○ | ○ | ○ | ◎ | ○ | ◎ | ◎ | ◎ |
|  | with Polybutylene terephthalate | ○ | ○ | ○ | ○ | ○ | ○ | ○ | ◎ | ◎ | ◎ |

|  |  | Examples | | | | | | | | |
|---|---|---|---|---|---|---|---|---|---|---|
|  | Items | 11 | 12 | 13 | 14 | 15 | 16 | 17 | 18 | 19 |
| Insulation materials | Linear low density polyethylene 1) | | | | | | | | | |
|  | Ethylene ethylacrylate 2) | | | | | | | | | |
|  | Ethylene vinyl acetate copolymer 3) | | | | | | | | | |
|  | Ethylene vinyl acetate copolymer 4) | 100 | 100 | | | | | | | |
|  | Maleic anhydride-grafted linear low density polyethylene 5) | | | 105 | | | | | | |
|  | Silane-grafted ethylene vinyl acetate copolymer 6) | | | | 105 | | | | | |
|  | Glycidyl methacrylate-grafted linear low density polyethylene 7) | | | | | 105 | | | | |
|  | Glycidyl methacrylate-grafted ethylene ethylacrylate 8) | | | | | | 105 | | | |
|  | Glycidyl methacrylate-grafted ethylene vinyl acetate copolymer 9) | | | | | | | 100.1 | | |
|  | Glycidyl methacrylate-grafted ethylene vinyl acetate copolymer 10) | | | | | | | | 105 | |
|  | Glycidyl methacrylate-grafted ethylene vinyl acetate copolymer 11) | | | | | | | | | 120 |
|  | Maleic anhydride 12) | | | | | | | | | |
|  | Vinyltrimethoxysilane 13) | 10 | 10 | | | | | | | |
|  | Glycidyl methacrylate 14) | | | | | | | | | |
|  | Melamine cyanurate 15) | | | | | | | | | |
|  | Aromatic condensation phosphate ester 16) | 10 | | | | | | | | |
|  | Magnesium hydroxide 17) | | 75 | | | | | | | |
|  | Presence of crosslinking | Yes | Yes | Yes | Yes | Yes | Yes | Yes | Yes | Yes |
| Evaluation | Heat resistance (presence of fusion, crack) | No | No | No | No | No | No | No | No | No |
| results | Gel fraction | 78 | 82 | 76 | 76 | 73 | 74 | 76 | 77 | 80 |
|  | Presence of bloom | No | No | No | No | No | No | No | No | No |
|  | Airtightness with Polyamide | ◎ | ◎ | ○ | ○ | ○ | ○ | ○ | ◎ | ◎ |
|  | with Polybutylene terephthalate | ◎ | ○ | ○ | ○ | ○ | ○ | ○ | ◎ | ◎ |

1) EVOLUE SP2030 manufactured by Prime Polymer Co., Ltd.
2) REXPEARL A1150 manufactured by Japan Polyethylene Corporation
3) EVAFLEX EV560 (vinyl acetate 14%) manufactured by Du Pont-Mitsui Polychemicals Co., Ltd.
4) EVAFLEX EV170 (vinyl acetate 33%) manufactured by Du Pont-Mitsui Polychemicals Co., Ltd.
5) Graft copolymerization of 5% of 12) with 1)
6) Graft copolymerization of 5% of 13) with 3)
7) Graft copolymerization of 20% of 14) with 1)
8) Graft copolymerization of 5% of 14) with 2)
9) Graft copolymerization of 0.1% of 14) with 4)
10) Graft copolymerization of 5% of 14) with 4)
11) Graft copolymerization of 20% of 14) with 4)
12) Maleic anhydride manufactured by NOF Corporation
13) KBM1003 manufactured by Shin-Etsu Chemical Co., Ltd.
14) BLEMMER G manufactured by NOF Corporation
15) MC-5S manufactured by Sakai Chemical Industry Co., Ltd.
16) PX-200 manufactured by Daihachi Chemical Industry Co., Ltd.
17) KISUMA 5A manufactured by Kyowa Chemical Industry Co., Ltd.

TABLE 2

(Unit: Parts by mass)

|  |  | Comparative examples | | | | | | | | |
|---|---|---|---|---|---|---|---|---|---|---|
|  | Items | 1 | 2 | 3 | 4 | 5 | 6 | 7 | 8 | 9 |
| Insulation materials | Linear low density polyethylene 1) | 100 | 100 | 100 | | | | | | |
|  | Low density polyethylene 2) | | | | 100 | 100 | | | | |
|  | Ethylene vinyl acetate copolymer 3) | | | | | | 100 | 100 | | |
|  | Glycidyl methacrylate-grafted ethylene vinyl acetate copolymer 4) | | | | | | | | 100.09 | |
|  | Glycidyl methacrylate-grafted ethylene vinyl acetate copolymer 5) | | | | | | | | | 121 |
|  | Maleic anhydride 6) | 20 | 0.09 | 21 | | | | | | |
|  | Vinyltrimethoxysilane 7) | | | | 0.09 | 21 | | | | |
|  | Glycidyl methacrylate 8) | | | | | | 0.09 | 21 | | |
|  | Presence of crosslinking | No | Yes | Yes | Yes | Yes | Yes | Yes | Yes | Yes |

TABLE 2-continued (Unit: Parts by mass)

| | Items | Comparative examples | | | | | | | | |
|---|---|---|---|---|---|---|---|---|---|---|
| | | 1 | 2 | 3 | 4 | 5 | 6 | 7 | 8 | 9 |
| Evaluation results | Heat resistance (presence of fusion, crack) | Fused | No | No | No | No | No | No | No | No |
| | Gel fraction | 0 | 75 | 75 | 73 | 75 | 76 | 77 | 75 | 82 |
| | Presence of bloom | No | No | Yes | No | Yes | No | Yes | No | Yes |
| | Airtightness with Polyamide | ○ | X | ○ | X | ○ | X | ◎ | X | ◎ |
| | with Polybutylene terephthalate | ○ | X | ○ | X | ○ | X | ◎ | X | ◎ |

1) EVOLUE SP2030 manufactured by Prime Polymer Co., Ltd.
2) REXPEARL A1150 manufactured by Japan Polyethylene Corporation
3) EVAFLEX EV560 (vinyl acetate 14%) manufactured by Du Pont-Mitsui Polychemicals Co., Ltd.
4) Graft copolymerization of 0.09% of 8) with 3)
5) Graft copolymerization of 21% of 8) with 3)
6) Maleic anhydride manufactured by NOF Corporation
7) KBM1003 manufactured by Shin-Etsu Chemical Co., Ltd.
8) BLEMMER G manufactured by NOF Corporation Next, Examples and Comparative examples will be explained below.

Examples

Example 1 was a crosslinked resin compound obtained by mixing 0.1 parts by mass of maleic anhydride as acid anhydride with respect to 100 parts by mass of linear low density polyethylene as ethylene-based copolymer to provide a resin compound, and crosslinking the resin compound by electron beam irradiation.

Example 2 was a crosslinked resin compound obtained by mixing 5 parts by mass of maleic anhydride as acid anhydride with respect to 100 parts by mass of linear low density polyethylene as ethylene-based copolymer to provide a resin compound, and crosslinking the resin compound by electron beam irradiation.

Example 3 was a crosslinked resin compound obtained by mixing 20 parts by mass of maleic anhydride as acid anhydride with respect to 100 parts by mass of linear low density polyethylene as ethylene-based copolymer to provide a resin compound, and crosslinking the resin compound by electron beam irradiation.

Example 4 was a crosslinked resin compound obtained by mixing 0.1 parts by mass of vinyl trimethoxysilane as silane coupling agent with respect to 100 parts by mass of ethylene ethylacrylate as ethylene-based copolymer to provide a resin compound, and crosslinking the resin compound by electron beam irradiation.

Example 5 was a crosslinked resin compound obtained by mixing 5 parts by mass of vinyl trimethoxysilane as silane coupling agent with respect to 100 parts by mass of ethylene ethylacrylate as ethylene-based copolymer to provide a resin compound, and crosslinking the resin compound by electron beam irradiation.

Example 6 was a crosslinked resin compound obtained by mixing 20 parts by mass of vinyl trimethoxysilane as silane coupling agent with respect to 100 parts by mass of ethylene ethylacrylate as ethylene-based copolymer to provide a resin compound, and crosslinking the resin compound by electron beam irradiation.

Example 7 was a crosslinked resin compound obtained by mixing 0.1 parts by mass of glycidyl methacrylate as monomer having an epoxy group with respect to 100 parts by mass of ethylene vinyl acetate copolymer as ethylene-based copolymer to provide a resin compound, and crosslinking the resin compound by electron beam irradiation.

Example 8 was a crosslinked resin compound obtained by mixing 5 parts by mass of glycidyl methacrylate as monomer having an epoxy group with respect to 100 parts by mass of ethylene vinyl acetate copolymer as ethylene-based copolymer to provide a resin compound, and crosslinking the resin compound by electron beam irradiation.

Example 9 was a crosslinked resin compound obtained by mixing 20 parts by mass of glycidyl methacrylate as monomer having an epoxy group with respect to 100 parts by mass of ethylene vinyl acetate copolymer as ethylene-based copolymer to provide a resin compound, and crosslinking the resin compound by electron beam irradiation.

Each of Examples 10 to 12 was a crosslinked resin compound obtained by mixing 10 parts by mass of vinyl trimethoxysilane as silane coupling agent with respect to 100 parts by mass of ethylene vinyl acetate copolymer as ethylene-based copolymer to provide a resin compound, and crosslinking the resin compound by electron beam irradiation. In addition, in Example 10, 20 parts by mass of melamine cyanurate as flame retardant was mixed into the resin compound. In Example 11, 10 parts by mass of aromatic condensation phosphate ester as flame retardant was mixed into the resin compound. In Example 12, 75 parts by mass of magnesium hydroxide as flame retardant was mixed into the resin compound.

Example 13 was a crosslinked resin compound obtained by graft-copolymerizing 5 parts by mass of maleic anhydride as acid anhydride with respect to 100 parts by mass of linear low density polyethylene as ethylene-based copolymer to provide a resin compound (maleic anhydride-grafted linear low density polyethylene), and crosslinking the resin compound by electron beam irradiation.

Example 14 was a crosslinked resin compound obtained by graft-copolymerizing 5 parts by mass of vinyl trimethoxysilane as silane coupling agent with respect to 100 parts by mass of ethylene vinyl acetate copolymer as ethylene-based copolymer to provide a resin compound (silane-grafted ethylene vinyl acetate copolymer), and crosslinking the resin compound by electron beam irradiation.

Example 15 was a crosslinked resin compound obtained by graft-copolymerizing 5 parts by mass of glycidyl methacrylate as monomer having an epoxy group with respect to 100 parts by mass of linear low density polyethylene as ethylene-based copolymer to provide a resin compound (glycidyl methacrylate-grafted linear low density polyethylene), and crosslinking the resin compound by electron beam irradiation.

Example 16 was a crosslinked resin compound obtained by graft-copolymerizing 5 parts by mass of glycidyl methacrylate as monomer having an epoxy group with respect to 100 parts by mass of ethylene ethylacrylate as ethylene-based copolymer to provide a resin compound (glycidyl methacrylate-grafted ethylene ethylacrylate), and crosslinking the resin compound by electron beam irradiation.

Example 17 was a crosslinked resin compound obtained by graft-copolymerizing 0.1 parts by mass of glycidyl methacrylate as monomer having an epoxy group with respect to 100 parts by mass of ethylene vinyl acetate copolymer as ethylene-based copolymer to provide a resin compound (glycidyl methacrylate-grafted ethylene vinyl acetate copolymer), and crosslinking the resin compound by electron beam irradiation.

Example 18 was a crosslinked resin compound obtained by graft-copolymerizing 5 parts by mass of glycidyl methacrylate as monomer having an epoxy group with respect to 100 parts by mass of ethylene vinyl acetate copolymer as ethylene-based copolymer to provide a resin compound (glycidyl methacrylate-grafted ethylene vinyl acetate copolymer), and crosslinking the resin compound by electron beam irradiation.

Example 19 was a crosslinked resin compound obtained by graft-copolymerizing 20 parts by mass of glycidyl methacrylate as monomer having an epoxy group with respect to 100 parts by mass of ethylene vinyl acetate copolymer as ethylene-based copolymer to provide a resin compound (glycidyl methacrylate-grafted ethylene vinyl acetate copolymer), and crosslinking the resin compound by electron beam irradiation.

Comparative Examples

Comparative Example 1 was a crosslinked resin compound obtained by mixing 20 parts by mass of maleic anhydride as acid anhydride with respect to 100 parts by mass of linear low density polyethylene as ethylene-based copolymer to provide a resin compound. The resin compound was not crosslinked by crosslinking treatment.

Comparative example 2 was a crosslinked resin compound obtained by mixing 0.09 parts by mass of maleic anhydride as acid anhydride with respect to 100 parts by mass of linear low density polyethylene as ethylene-based copolymer to provide a resin compound, and crosslinking the resin compound by electron beam irradiation.

Comparative example 3 was a crosslinked resin compound obtained by mixing 21 parts by mass of maleic anhydride as acid anhydride with respect to 100 parts by mass of linear low density polyethylene as ethylene-based copolymer to provide a resin compound, and crosslinking the resin compound by electron beam irradiation.

Comparative example 4 was a crosslinked resin compound obtained by mixing 0.09 parts by mass of vinyl trimethoxysilane as silane coupling agent with respect to 100 parts by mass of low density polyethylene as ethylene-based copolymer to provide a resin compound, and crosslinking the resin compound by electron beam irradiation.

Comparative example 5 was a crosslinked resin compound obtained by mixing 21 parts by mass of vinyl trimethoxysilane as silane coupling agent with respect to 100 parts by mass of low density polyethylene as ethylene-based copolymer to provide a resin compound, and crosslinking the resin compound by electron beam irradiation.

Comparative example 6 was a crosslinked resin compound obtained by mixing 0.09 parts by mass of glycidyl methacrylate as monomer having an epoxy group with respect to 100 parts by mass of ethylene vinyl acetate copolymer as ethylene-based copolymer to provide a resin compound, and crosslinking the resin compound by electron beam irradiation.

Comparative example 7 was a crosslinked resin compound obtained by mixing 21 parts by mass of glycidyl methacrylate as monomer having an epoxy group with respect to 100 parts by mass of ethylene vinyl acetate copolymer as ethylene-based copolymer to provide a resin compound, and crosslinking the resin compound by electron beam irradiation.

Comparative example 8 is a crosslinked resin compound obtained by graft-copolymerizing 0.09 parts by mass of glycidyl methacrylate as monomer having an epoxy group with respect to 100 parts by mass of ethylene vinyl acetate copolymer as ethylene-based copolymer to provide a resin compound (glycidyl methacrylate-grafted ethylene vinyl acetate copolymer), and crosslinking the resin compound by electron beam irradiation.

Comparative example 9 was a crosslinked resin compound obtained by graft-copolymerizing 21 parts by mass of glycidyl methacrylate as monomer having an epoxy group with respect to 100 parts by mass of ethylene vinyl acetate copolymer as ethylene-based copolymer to provide a resin compound (glycidyl methacrylate-grafted ethylene vinyl acetate copolymer), and crosslinking the resin compound by electron beam irradiation.

Each of the insulation materials in Examples in TABLE 1 and in comparative examples in TABLE 2 was applied around a bundled conductor including seven elemental conductors with a diameter of 0.26 mm (7 pcs/0.26 mm) by extrusion coating with the use of a 40 mm extruder (L/D=24) to have an outer diameter of 1.5 mm. Electron beam with a dose of 150 kGy was irradiated to the insulated wire thus obtained to provide a crosslinked insulated wire (however, in Comparative example 1, the resin compound was not crosslinked by crosslinking treatment).

The crosslinked insulated wire thus produced was evaluated by the following tests.

(Heat Resistance Test)

The crosslinked insulated wire was wound around a rod with a diameter of 2.3 mm, and heated for 6 hours in a constant temperature chamber at a temperature of 170 degrees Celsius. After the crosslinked insulated wire was taken out from the constant temperature chamber, it was cooled to a room temperature. When neither fusion nor crack was found, the crosslinked insulated wire was rated as "Pass".

(Gel Fraction)

As an index of the degree of crosslinking of the insulation, a gel fraction of the insulation material was measured. After the conductor has been removed from the crosslinked insulated wire, the extraction was carried out for 24 hours with hot xylene at a temperature of 130 degrees Celsius, to provide the gel fraction.

The gel fraction was calculated as:

$$(\text{Residual gel weight after extraction})/(\text{Insulation weight before extraction}) \times 100(\%).$$

(Presence of Bloom)

The presence of bloom on the surface of the crosslinked insulated wire was evaluated by observing the appearance of the crosslinked insulated wire after storage for one week in an environment at a temperature of 23 degrees Celsius and 50% RH (relative humidity). When no bloom was found, the wire was rated as "Pass" (○). When the bloom was remarkable and the appearance was impaired, the crosslinked insulated wire was rated as "Failure" (x).

(Airtightness Test)

In the airtightness test, the waterproofness and the airtightness were evaluated.

Figure 9:
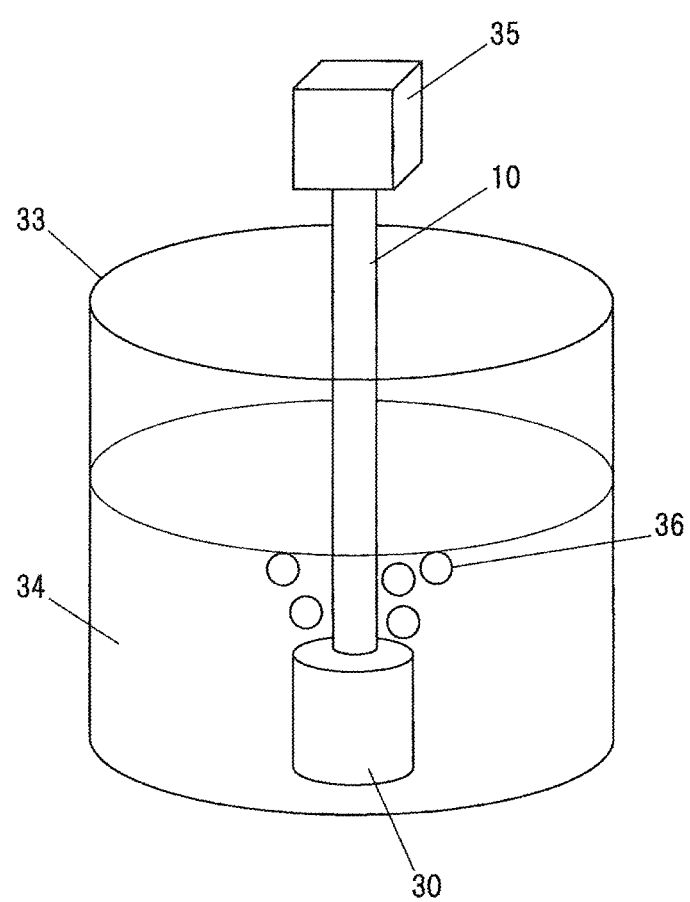
FIG. 9 is a test apparatus for testing airtightness between the wire coated with the resin molding and the resin molding in Examples and Comparative examples.

For the airtightness test, as shown in FIG. 9, a molded product (with a diameter of 15 mm, a length of 20 mm, and a wire insertion length of 15 mm) was prepared by injection molding of polyamide resin (reinforced by glass fibers of 30% by weight) "Reny 1002F" (manufactured by Mitsubishi Engineering-Plastics Corporation) or polybutylene terephthalate (reinforced by glass fibers of 30% by weight) "NOVADURAN 5010G30×4" (manufactured by Mitsubishi Engineering-Plastics Corporation) at one end of the wire 10. Thereafter, the terminal of the molded product was sealed to provide a sample of a resin molding 30. For the obtained samples, heat shock test was carried out for 1,000 cycles under the condition at a temperature of −40 degrees for 30 minutes and a temperature of 125 degrees Celsius for 30 minutes.

Subsequently, as shown in FIG. 9, the resin molding 30 was immersed in the water 34 of a water vessel 33, and a compressed air was pumped into the end of the wire 10 at a pressure of 30 kPa for 30 seconds from an air supplier 35. When no bubble 36 was discharged from a space between the resin molding 30 and the wire 10, the resin molding 30 was rated as "Pass".

Furthermore, for each of the molded products rated as "Pass", the wire 10 was pulled out from the resin molding 30 which was held by a support jig, to examine the morphology of the fracture. 50 pieces for each of examples and comparative examples were tested. When all the samples were rated as "Pass" and the mold resin of each sample was broken during the drawing of the wire 10, it was rated as "Excellent" (⊚). When all the samples were rated as "Pass" and the interfacial failure (i.e. the wire 10 was stripped off from the resin molding 30) occurred during the drawing of the wire 10, it was rated as "Good" (○). When the number of samples rated as "Pass" was less than 50, it was rated as "Not good" (x). Here, the "Excellent" (⊚) means the adhesion stronger than "Good" (○).

In other words, this test evaluated the degree of the adhesion strength between the wire 10 and the resin molding 30. It is evaluated that the airtightness and the waterproofness would be increased in accordance with the increase in the adhesion strength.

In Examples 1 to 19, the fusion (melting) or crack was not found in the heat resistance test, and the bloom was not found. Further, in the airtightness test, the airtightness was rated as "Excellent" (⊚) or "Good" (○) for the both cases of using the polyamide resin or polybutylene terephthalate as the mold resin. Therefore, the good airtightness was obtained. Particularly, Examples 8 to 11, 18 and 19 using the ethylene vinyl acetate copolymer including 5 to 20 parts by mass of maleic anhydride, vinyl trimethoxysilane, or glycidyl methacrylate were rated as "Excellent" (⊚) in TABLE 1, the adhesion with the mold resin was high, and the number of samples in which the mold resin was broken during the drawing of the wire was large. Therefore, it is confirmed that the adhesion with the mold resin was excellent. Namely, it is confirmed that significantly high airtightness and waterproofness were obtained in Examples 8 to 11, 18 and 19.

On the other hand, in Comparative example 1, the insulation was fused in the heat resistance test since the crosslinking by the electron beam irradiation was not carried out.

In Comparative examples 2, 4, 6, and 8, since the additive amount of the acid anhydride, silane coupling agent, or monomer having an epoxy group was less than 0.1 parts by mass, the airtightness with the mold resin was not enough. In Comparative examples 3, 5, 7, and 9, since the additive amount of the acid anhydride, silane coupling agent, or monomer having an epoxy group was greater than 20 parts by mass, the bloom appeared on the surface of the crosslinked insulated wire.

As explained above, it is confirmed that the additive amount of the acid anhydride, silane coupling agent, or monomer having an epoxy group is preferably 0.1 to 20 parts by mass.

From the evaluation results, as described above, it is assumed that each of the acid anhydride, silane coupling agent, and monomer having an epoxy group to be included in the ethylene-based copolymer has an active functional group comprising a hydroxyl group (—OH) and/or an oxo group (=O) in its molecular structure, so that the above active functional group bonds with polybutylene terephthalate resin or polyamide resin, thereby improves the adhesion between the crosslinked resin compound according to the invention and the mold resin. It is further confirmed that the crosslinked resin compound according to the invention allows the resin compound having excellent adhesion with the mold resin and excellent appearance (with no bloom) and the wire and cable using the same.

As shown in TABLE 2, some comparative examples were excellent in adhesion with the mold resin but not excellent in appearance, whereas some comparative examples were excellent in appearance but not excellent in adhesion with the mold resin.

The present invention is superior to the prior art in achieving both the effect of providing the excellent adhesion with the mold resin and the effect of providing the good appearance.

As to the crosslinking method, the crosslinking by electron beam irradiation was carried out in the present embodiments. However, the present invention is not limited thereto. The other crosslinking methods are applicable.

As described above, according to the present invention, it is possible to provide to a crosslinked resin compound having an excellent adhesion (including waterproofness and airtightness) with a resin molding as well as excellent heat resistance and appearance, and a wire and a cable using the same, which are suitable for e.g. a sensor cable for vehicles, robots, electronic devices, and the like, so that the industrial applicability is assumed to be extremely high.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A wire, comprising:
   a conductor;
   an insulation covering an outer periphery of the conductor; and
   a resin molding covering an outermost layer of the insulation, the resin molding comprising polybutylene terephthalate resin or polyamide resin,
   wherein an outermost layer of the insulation comprises a crosslinked resin compound comprising a resin compound comprising 0.1 to 20 parts by mass of one material selected from the group consisting of a monomer including an epoxy group and a silane coupling agent with respect to 100 parts by mass of ethylene-based copolymer, the resin compound being crosslinked, and wherein the outermost layer does not include thermoplastic polyurethane.

2. The wire according to claim 1, wherein the resin compound is crosslinked by electron beam irradiation.

3. The wire according to claim 1, wherein the ethylene-based copolymer comprises one of a linear low-density polyethylene, an ethylene ethyl acrylate copolymer, and ethylene vinyl acetate copolymer.

4. The wire according to claim 1, wherein a content of the one material selected from the group consisting of the monomer including the epoxy group and the silane coupling agent is 5 to 20 parts by mass with respect to 100 parts by mass of the ethylene-based copolymer.

5. The wire according to claim 1, wherein the monomer including the epoxy group comprises glycidyl methacrylate.

6. The wire according to claim 1, wherein the resin molding is directly disposed on the outermost layer of the insulation.

7. A cable, comprising:
one or more wire provided solely, bundled together or stranded together, the one or more wire comprising a conductor and an insulation covering an outer periphery of the conductor;
a sheath covering an outer periphery of the one or more wire; and
a resin molding covering an outermost layer of the sheath, the resin molding comprising polybutylene terephthalate resin or polyamide resin;
wherein an outermost layer of the sheath comprises a crosslinked resin compound comprising a resin compound comprising 0.1 to 20 parts by mass of one material selected from the group consisting of monomer including an epoxy group and silane coupling agent with respect to 100 parts by mass of ethylene-based copolymer, and the resin compound being crosslinked, and
wherein the outermost layer does not include thermoplastic polyurethane.

8. The cable according to claim 7, wherein the resin compound comprises an electron beam irradiated crosslinked resin.

9. The cable according to claim 7, wherein the ethylene-based copolymer comprises one of a linear low-density polyethylene, an ethylene ethyl acrylate copolymer, and ethylene vinyl acetate copolymer.

10. The cable according to claim 7, wherein a content of the one material selected from the group consisting of the monomer including the epoxy group and the silane coupling agent is 5 to 20 parts by mass with respect to 100 parts by mass of the ethylene-based copolymer.

11. The cable according to claim 7, wherein an outermost layer of the insulation comprises a crosslinked resin compound comprising a resin compound comprising 0.1 to 20 parts by mass of one material selected from the group consisting of monomer including the epoxy group and a silane coupling agent with respect to 100 parts by mass of ethylene-based copolymer, the resin compound being crosslinked.

12. The cable according to claim 7, wherein a content of the one material selected from the group consisting of the monomer including the epoxy group and the silane coupling agent is 5 to 20 parts by mass with respect to 100 parts by mass of the ethylene-based copolymer.

13. The cable according to claim 12, wherein the resin molding covers an outermost layer of the insulation together with the outermost layer of the sheath.

14. The cable according to claim 7, wherein the monomer including the epoxy group comprises glycidyl methacrylate.

* * * * *